US012444391B2

(12) United States Patent
Miller

(10) Patent No.: US 12,444,391 B2
(45) Date of Patent: Oct. 14, 2025

(54) ADJUSTABLE FINGERPICK

(71) Applicant: Lauren Flint Miller, Shawnee, KS (US)

(72) Inventor: Lauren Flint Miller, Shawnee, KS (US)

( * ) Notice: Subject to any disclaimer, the term of this patent is extended or adjusted under 35 U.S.C. 154(b) by 61 days.

(21) Appl. No.: 18/957,678

(22) Filed: Nov. 23, 2024

(65) Prior Publication Data

US 2025/0166590 A1 May 22, 2025

(51) Int. Cl.
*G10D 3/173* (2020.01)

(52) U.S. Cl.
CPC .................................... *G10D 3/173* (2020.02)

(58) Field of Classification Search
CPC ...................................................... G10D 3/173
See application file for complete search history.

(56) References Cited

U.S. PATENT DOCUMENTS 401,476 A * 4/1889 Barnes ................... G10D 3/173 84/322
413,579 A * 10/1889 Stewart .................. G10D 3/173 84/322
471,221 A * 3/1892 Moores ................. A61F 13/105 D11/27
566,806 A * 9/1896 Shearer .................. G10D 3/173 84/322
756,348 A * 4/1904 Forney ................... G10D 3/173 84/322
842,920 A * 2/1907 Thedorf ................. G10D 3/173 84/322
1,296,284 A * 3/1919 Gilman .................. G10D 3/173 84/322
1,444,982 A * 2/1923 Orth ....................... G10D 3/173 84/322
1,787,136 A * 12/1930 Beauchamp ........... G10D 3/173 84/322
2,016,438 A * 10/1935 Kealoha ................. G10D 3/173 84/322
2,221,234 A * 11/1940 Frasier ................... G10D 3/173 84/322
3,739,681 A * 6/1973 Dunlop .................. G10D 3/173 84/322
4,879,940 A * 11/1989 Pereira ................... G10D 3/173 84/322
5,323,677 A * 6/1994 Knutson ................ G10D 3/173 84/322

(Continued)

*Primary Examiner* — Robert W Horn

(57) ABSTRACT

A pick to be worn on a musician's finger, for plucking the strings of a musical instrument, comprising a blade for contacting the strings, a blade shaft connecting it to the body of the pick, a locator arm that supports the blade to maintain its position relative to the body, a thrust receiver band which encircles the finger behind the cuticle of the nail to stabilize the pick against longitudinal displacement, left and right side rails to control lateral movement of the pick, a retention band deformably encircling the middle phalange to hold the pick firmly on the finger, and a profile extention arm that limits the flex of the finger's first and second joints. The nonsymmetric shape of the blade allows one edge to lead as it approaches a string. Adjustments over a wide range can be made easily and independently to multiple parameters.

9 Claims, 11 Drawing Sheets

(56) References Cited

U.S. PATENT DOCUMENTS

| | | | | | |
|---|---|---|---|---|---|
| 5,864,075 | A * | 1/1999 | Mapson | G10D 3/173 | 84/322 |
| 6,335,477 | B1 * | 1/2002 | Miller | G10D 3/173 | 84/322 |
| 7,375,268 | B1 * | 5/2008 | Thornhill | G10D 3/173 | 84/322 |
| 8,764,898 | B2 * | 7/2014 | Hobbs | C09J 105/00 | 106/205.71 |
| 9,135,898 | B1 * | 9/2015 | McVicker | G10D 3/173 | |
| 2016/0351175 | A1 * | 12/2016 | Torgler | G10D 3/173 | |

* cited by examiner

ADJUSTABLE FINGERPICK

PRIOR ART

Players of stringed instruments such as guitars, ukuleles, and banjos may simply activate the strings using their hands and fingers directly, or they may use picks, made of metal, plastic, horn etc. as utensils for doing so. Such picks fall into two broad categories: those, commonly referred to as flat-picks, intended to be used by gripping the pick between thumb and forefinger; and those which are mounted on the individual digits (fingers or thumbs) in such a way that no gripping is required. As the present invention falls into the latter category, discussion here of prior art will be limited to that category, and more specifically to fingerpicks which are finger-mounted, as opposed to thumbpicks, which are worn on the thumb. A further subcategory within the category of fingerpicks comprises those designed to augment or supplement the action of the fingernail in striking the string, leaving the fleshy tip of the finger exposed to contact the string as well. By contrast to these fingernail-type picks, picks of the fingertip-type are designed to cover the tip of the finger and supplant the fingernail entirely. Fingertip-type picks address a unique set of playing objectives, and at the same time present a unique set of issues and complications. As the present invention falls within this latter category, this discussion will therefore be limited to picks of this type, and the term fingerpick used to refer only to such picks; and the term pick, unless otherwise indicated, will be interchangeable with fingerpick.

In the prior art, fingerpicks are typically, with a narrow range of variations, formed from a single flat sheet of metal or plastic having a three-leaved shape with two side leaves (with each sometimes divided into two sub-leaves) on either side of a center leaf, termed the blade. Referring here to FIG. 1, the side leaves (2) and (3) (henceforth called wings), diametrically opposite one another, are designed to curve up and over the sides of the first segment of a musician's finger while the blade (1) curves up over the front of the finger, culminating in a tip (4) which provides the last point of contact as the blade activates a string.

Every fingerpick user expects, and is expected, to adjust and adapt any off-the-shelf commercial pick to meet their individual physiological and musical requirements. There are several matters which are of vital concern to users as they adjust their picks. These include retention—keeping the pick on the finger during use; orientation—resisting its dislocation to either side of the finger; and stability-resisting the longitudinal thrust created by the forceful contact of pick against string. Also of concern are the ease with which the pick may be placed on or removed from the finger, and the comfort of wearing it in playing (wearability); seeing to it that, in use, the pick contacts the strings quickly and smoothly and without entanglement, yet with sufficient force to properly sound the instrument (efficiency); and eliciting the best tone possible, according to the standards of the style of music being played (tone). All of these factors are in consideration when users set out to adjust a fingerpick to suit their personal requirements.

The immediate physiological context of such adjustment is what might be called the geometry of the hand: the relationships among the fingers in playing, the attitude of the fingers relative to the hand, and the hand's position relative to the strings. Is the tip of the finger to be angled more perpendicular to the plane of the strings, or more parallel? How is the finger to be curled—tightly, with the first and third segments approaching a parallel relationship, or loosely, with the finger standing more perpendicular to the plane of the strings? Is the finger's path oblique to the string, or at a right angle?—and so on. Music teachers, and books describing how to use fingerpicks to play a stringed instrument, normally begin by addressing the matter of correct playing geometry.

Such instruction will also address the further issue of which strings are to be picked by which fingers. The index finger, for example, is typically assigned to pick the strings of the treble side of the fingerboard of the instrument, farthest from the player's upper body, while the thumb is assigned to the lower-pitched strings nearer to the player. Such rules of string distribution, limiting the range the fingers are called upon to reach to or across in actual use, accordingly limit the conditions to which the picks must be adjusted to maintain a desirable hand geometry.

For similar reasons, standard technique prescribes that, as playing speed increases, consecutive strokes by a single digit (finger or thumb) are increasingly to be avoided. This rule of finger order, requiring that consecutive notes be sounded by different digits, thus allows time for a given digit to "reset" its geometry as it moves from making one stroke to making its next.

In sum, when adjustments are made to fingerpicks, it is to obtain the best performance within the conventions regarding the geometry of the hand, the range of strings assigned to each digit, and the production of consecutive notes by the same digit. And conversely, instructions for using the pick constrain its use to ranges and sequences of strings wherein it can readily be adjusted to meet the various objectives of adjustment—security, efficiency, etc.

BACKGROUND OF THE INVENTION

In connection with picking techniques other than finger-picking, the broader community of stringed-instrument musicians has long been aware of the musical benefits of "sweeping" a single digit across multiple strings—especially in terms of speed and efficiency of note production. This is an acknowledged technique in the worlds of jazz and rock guitar, for example. Such a motion may be made with a flatpick, thumb pick, bare fingers or fingernail-type picks. But it is unheard of as a fingerpick technique. A downward sweep with a fingerpick, directed away from the musician's upper body, is clearly out of the question, as the curved blades would immediately snag the strings. But even upward sweeps encounter numerous real difficulties, beyond merely contravening the conventional rules regarding string distribution and finger order, and accordingly are virtually never used.

In the following discussion, the term sweep-picking will refer to the technique of using a single motion of a finger to play consecutive notes on two or more adjacent strings of an instrument, at tempos too fast to allow resetting of the normal hand geometry, and potentially beyond the range of strings normally assigned to that finger by the conventions of fingerpicking.

Parameters of Pick Adjustment

To further appreciate the obstacles to sweep-picking presented by the design of the typical fingerpick of the prior art, it is useful to consider these three basic parameters of adjustment pertaining to the shape of the blade and its relationship to the wearer's finger. Referring here to FIG. 3, reference numbers 21, 22, and 23, these are:

Reach (21): the distance, along the finger's longitudinal axis, between the tip (11) of the finger and the tip (4) of the blade;

Loft (22): the height of the tip (4) of the blade as a distance relative to the top of the nail (12) of the finger;

Caster (23): the angle of the blade (1), relative to the string (8), in the area where it will initially strike the string.

The contour of the blade, and especially the shape (e.g. rounded, pointed, etc.) of the tip of the blade—also have significant bearing on the performance of the pick, but these factors are better classified as modifiable rather than as adjustable, since they can be changed only by removing material from the pick.

Three further parameters are relevant to the performance of a pick, although they are not widely referred to, since in a pick of the prior art they are minimal and not easily adjustable. They are:

Lead: the shape and orientation of the blade of the pick such that one edge of the blade will be first to contact the string as the blade approaches it at a right angle. The lead of a prior art fingerpick is typically non-existent. In the present invention, the edge that is designed to lead is referred to as the leading edge (cf. FIG. 10, ref. #48).

Camber: the slant, toward or away from the bridge, of the leading edge of the pick, assuming there is one (cf. FIG. 10, ref. #24). Camber can be a factor in determining the extent to which the pick slides along the string while crossing, and also the speed with which the point of contact between blade and string moves along the blade toward its point of departure at the tip. Since the blade of a pick of the prior art will not typically present a leading edge, camber in that context is an irrelevant consideration.

Profile: the shape of the longitudinal surface of the pick that contacts the underside of the wearer's finger (cf FIG. 9, ref. #46). The profile determines the extent to which the pick permits or inhibits the finger's flex, i.e. the bending of its joints as it draws a pick across the strings. While such curl is a standard topic of instruction concerning hand geometry, prior art fingerpicks lack any means of affecting it, so profile is not a consideration in their adjustment.

Obstacles to Sweep-Picking with Picks of the Prior Art

A fingerpick of the prior art, though well-adjusted to activate the treble strings, may not perform well when a sweep takes it beyond its normal range. For example, a caster sufficiently oblique to effectively engage a near (bass) string at the end of the finger's arc across the strings may be too acute to properly activate the treble strings at the beginning of the arc. Also, while the loft and reach of a conventional pick may allow it to sound a treble string properly and avoid damping it with the flesh of the fingertip as the pick leaves the string, this extent of loft may be insufficient to properly engage a bass string at the end of a sweep, and the reach may offer insufficient distance between blade and finger tip to avoid subsequent damping of the string by the finger.

Characteristically, the joints of the human finger do not move independently. As the finger traces an arc from the farthest strings to the nearest, the proximal phalange flexes toward the palm of the hand, the medial phalange approaches a perpendicular position and the distal phalange tends more and more to a position parallel to the palm. With the hand in position above a fingerboard, fingerpicks of the prior art, lacking means of limiting the finger's curl, may thus allow the upper portions of the wings of the pick or the back of player's finger to scrape or snag the strings as the sweep of the finger goes beyond its normal range.

Another obstacle encountered in sweep-picking concerns the security of the pick on the finger. In the prior art, the pick is retained, oriented, and stabilized entirely by pressure applied to the flesh of the finger by the side wings that wrap up around it. However, the pressure necessary to achieve these objectives may cause discomfort to the wearer, especially if the wings compress the cuticle of the fingernail.

In addition, since a fingertip tends to slope downward from knuckle to tip, any loosening of the pick is self-reinforcing, as the pick slides forward in the direction of the tip's softer tissue and smaller cross-sectional diameter. Without intervention, once loosening has begun complete loosening is almost inevitable. Serious as this problem is in conventional picking with prior art picks, it becomes more so in sweep-picking as a finger covers greater distances without resetting, and possibly into contact with strings outside of its normal range, exposing the pick to greater danger of being flicked off as the finger returns to its initial position.

While a conventional fingerpick can be adjusted to a greater or lesser extent regarding any of its basic parameters, the typical prior-art design does not permit isolation of the individual parameters, with the consequence that any change of one parameter may involve the inadvertent and unavoidable change of other parameters as well, or of other basic objectives such as wearability or retention. For example (referring to FIG. 1), due to the direct coupling (5) of blade (1) to wings (2) and (3) which hold the pick on the finger, a significant increase in reach can be achieved only by bending the tip of the blade down and forward, which in turn changes the caster and decreases the loft. Alternatively, moving the pick forward on the finger to increase reach may cause it to be less secure or require more painful pressure to keep it in place. Due to this interdependence, the adjustability of a conventional pick is significantly circumscribed by the necessity of reaching a compromise among all parameters.

SUMMARY OF THE INVENTION

A fingerpick for playing a string musical instrument is disclosed, that is fully configurable and adjustable by a person of modest mechanical skills, beginning with a pre-cut flat blank of a suitable material and equipped with a small kit of inexpensive hand tools.

The design of this fingerpick allows it to be retained and oriented on a user's finger, and stabilized against longitudinal displacement, without requiring uncomfortable compressive pressure on either the flesh of the fingertip or the cuticle of the nail.

Retention of this pick on the finger is provided by a band that encircles the distal metaphysis of the medial phalange with a mild compressive pressure; the diameter of the circle can readily and temporarily be enlarged for ease of placing the pick on or removing it from the finger.

This fingerpick offers new parameters of adjustability, and in all parameters it is readily, precisely and independently adjustable over a wide range as required by the technique of sweep picking, i.e. the rapid production of notes in a continuous sweep of the pick across multiple strings.

This fingerpick incorporates a blade locator arm which transmits thrust against the blade back to a thrust receiver band partially encircling the finger above the nail of the distal phalange. The locator arm serves to stabilize the blade longitudinally, thus permitting the blade and blade shaft to be especially long and narrow with no loss of stability under pressure. Blade and shaft are accordingly easy to adjust in effective length and in direction of curvature.

The assymetric shape of the blade allows the pick to present a distinct leading edge as it approaches the string, introducing lead and camber as novel and adjustable parameters in the fine-tuning of the pick.

This fingerpick further incorporates a profile extention arm, which may be adjusted to limit the flexing of the player's finger as it sweeps the pick across a range of strings from treble to bass, thus avoiding the undesirable situation in which the knuckle or back of the finger contacts and interferes with the strings.

GLOSSARY OF BASIC ELEMENTS (BY REFERENCE NUMBER IN FIG. 4.)

40: Body. With the tip of the musician's finger oriented in the direction of arrow (30), the Body lies along the underside of the finger and provides the *nexus* connecting all other arms, bands, and extentions.

41: Thrust Receiver Band. Partially encircles the musician's finger tip, directly ahead of the first knuckle, to prevent the pick from being dislocated rearward. See FIGS. 6 and 9.

42, 44: Left and Right Rails. Curve upward from Body (40) along either side of the first segment of the finger to keep the pick from skewing left or right. See FIGS. 6 and 9.

43: Blade Locator Arm. After the Blade (50) has been reoriented to the front of the pick by creating the Reverse Loop (see FIG. 7), the locator stabilizes its position relative to the Body (40) by contacting the back surface of the Blade (50). See FIG. 8.

45: Profile Extension Arm Offset. Allows the Profile Extension Arm (46) to be bent over to lie directly above the blade shaft (51). See FIG. 5.

46: Profile Extention Arm. Extends rearward along the underside of the finger, limiting how tightly the first two joints of the finger can be curled. See FIG. 7.

47: Profile Extention Arm Tip. Includes extra length to allow trimming as required by individual user.

48: Leading Edge. In the final stages of adjustment of pick, will be the edge of the Blade (50) that makes initial contact with strings of the instrument being played. See FIG. 10.

49: Blade Tip. Positioned by final adjustment of the pick to be the point of separation as Blade (50) completes activation of a string.

50: Blade. The forward-most element of the pick as finally configured, which makes initial contact with the string of a musical instrument. See FIG. 7.

51: Blade Shaft. Connects Blade (50) to Body (40). Its relatively narrow width permits ease of adjustment in effective length and orientation. See FIG. 11.

52: Retention Band. Fully encircles the finger behind the first knuckle, to secure pick to finger without excessive pressure. See FIGS. 5 and 9.

53: Retention Band Tip. Includes extra length to allow trimming to a position where it can be pressed to enlarge the circle formed by the Retention Band, allowing ease of placement on or off finger. See FIG. 8.

54: Reverse Loop (not shown in FIG. 4). Formed by Blade Shaft (51) as it is reoriented from its initial projection rearward from Body (40) to a new position pointing forward under Body. See FIG. 7.

DETAILED DESCRIPTION OF THE INVENTION

Figure 1:
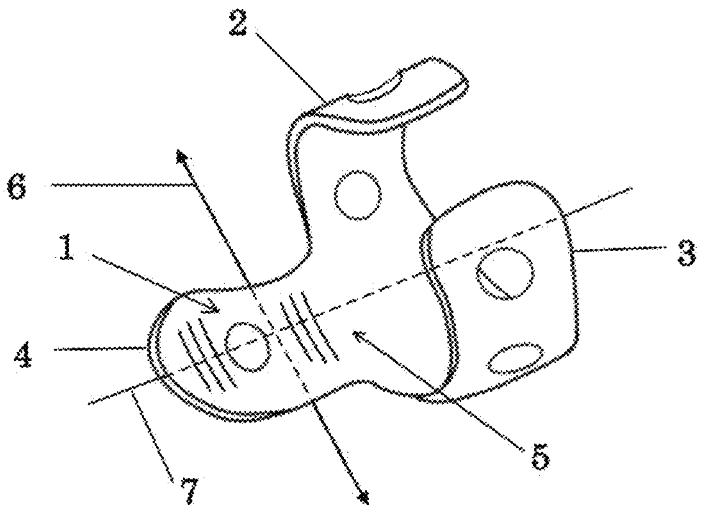
FIG. 1 shows the parts and configuration of a typical pick of the prior art.
Figure 2:
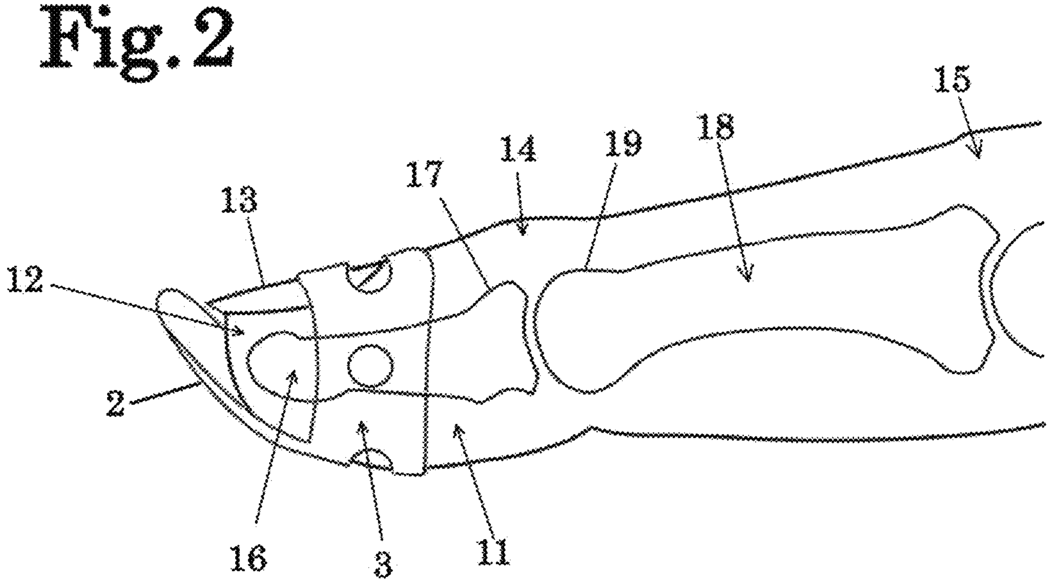
FIG. 2 shows this typical pick in its intended position on a musician's finger as it might appear in a side view, with the assumption that skin and flesh are transparent. Relationships are thus made apparent, between aspects of the prior art pick and aspects of the bones of the finger.
Figure 3:
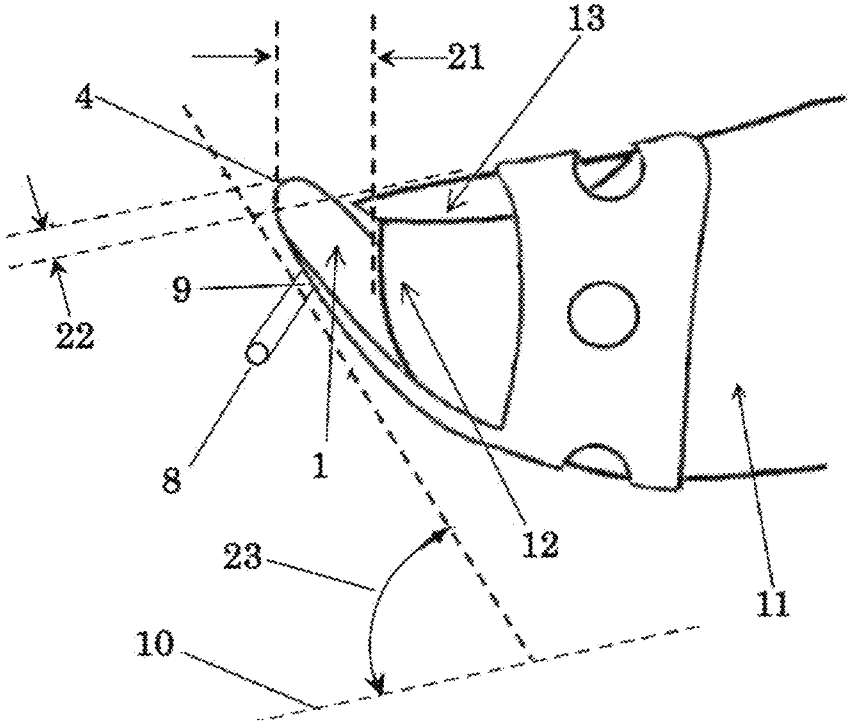
FIG. 3 illustrates, relative to this typical pick, three main parameters of adjustment: reach, loft, and caster.

FIG. 1, FIG. 2, and FIG. 3 all represent a typical fingerpick of the prior art. FIG. 1 illustrates the standard three components of such a pick: the blade (1); the right wing (2), designed to be bent up and over the right (far) side of a finger of the player's right-hand; and the left wing (3), to be bent up and over the near (left) side. Line (6) indicates the orientation of the curvature of the blade, which is perpendicular to the longitudinal axis (7) of the pick. It further illustrates the close-coupled connection (5) between the blade and the two wings.

FIG. 2 shows this typical pick in its intended position on the first segment of the finger (11) of the player's hand, with the blade (1) curving up and in front of the finger-tip (12) and the left wing (3) bent around the side of the finger and, typically, at least partially over the nail (13). Also shown are the skeletal components internal to the finger (11), illustrating the relationship between the left wing (3) and the metaphysis (17) of the distal phalange (16) of the finger, and the position of the left wing (3) ahead of the first knuckle (14).

FIG. 3 illustrates the concepts of Reach, Loft, and Caster with regard to the relationships between the pick of FIG. 2, the finger (11) and a string (8) of the instrument being played. Reach refers to the distance (21) between the tip (4) of the blade (1) and the tip (12) of the finger (11). Loft (22) is a measure of the extent to which the tip (4) of the blade (1) extends above or below the level of the top of the fingernail (13). Caster (23) refers, roughly, to the slant of the blade; or, more precisely, to the angle between a line (10)

parallel to the longitudinal axis of the finger and a line (28) tangential to the blade of the pick (1) at the point of its contact (9) with the string (8).

Figure 4:
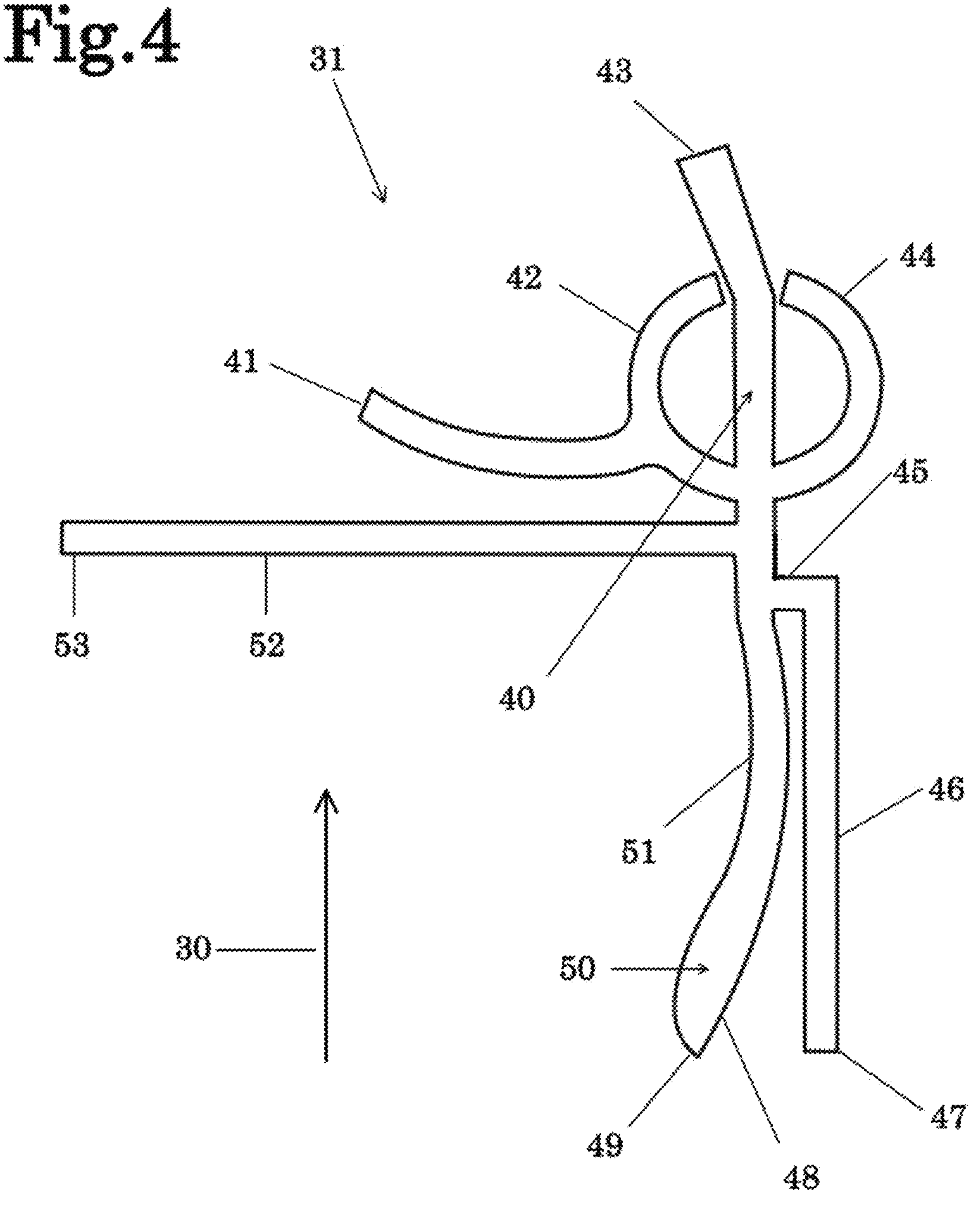
FIG. 4 represents the present invention in its initial stage of configuration, as a pre-cut flat blank of the suitable material with the various features of the pick in their initial, two-dimensional form.

FIG. 4 represents, in accordance with the stated objective of the present invention of disclosing a fingerpick suitable for complete configuration and adjustment by the user, a pre-cut flat blank (31) of the suitable material (for example, 0.025 brass sheet) with the various features of the pick in their initial, two-dimensional form. Every element of the pick to be found in its final configuration is represented here, with the exception of the Reverse Loop (cf. ref. #54 in FIG. 7): the body (40), the thrust receiver band (41), the blade locator arm (43), the right rail (44), the profile extention offset (45), the profile extention arm (46), the profile extention arm tip (47), the leading edge (48) and tip (49) of the blade (50), the blade shaft (51), the retention band (52), and the retention band tip (53). All elements identified in FIG. 4 are described in the Glossary preceding this section.

It is assumed, in this and all of the following descriptions, that the pick is intended to be mounted on a finger of the player's right hand. For a left-handed player, a mirror image of the blank (31) shown in FIG. 4 could be taken as the basis for subsequent modifications, reading "left" for right and vice versa, as appropriate.

Figure 5:
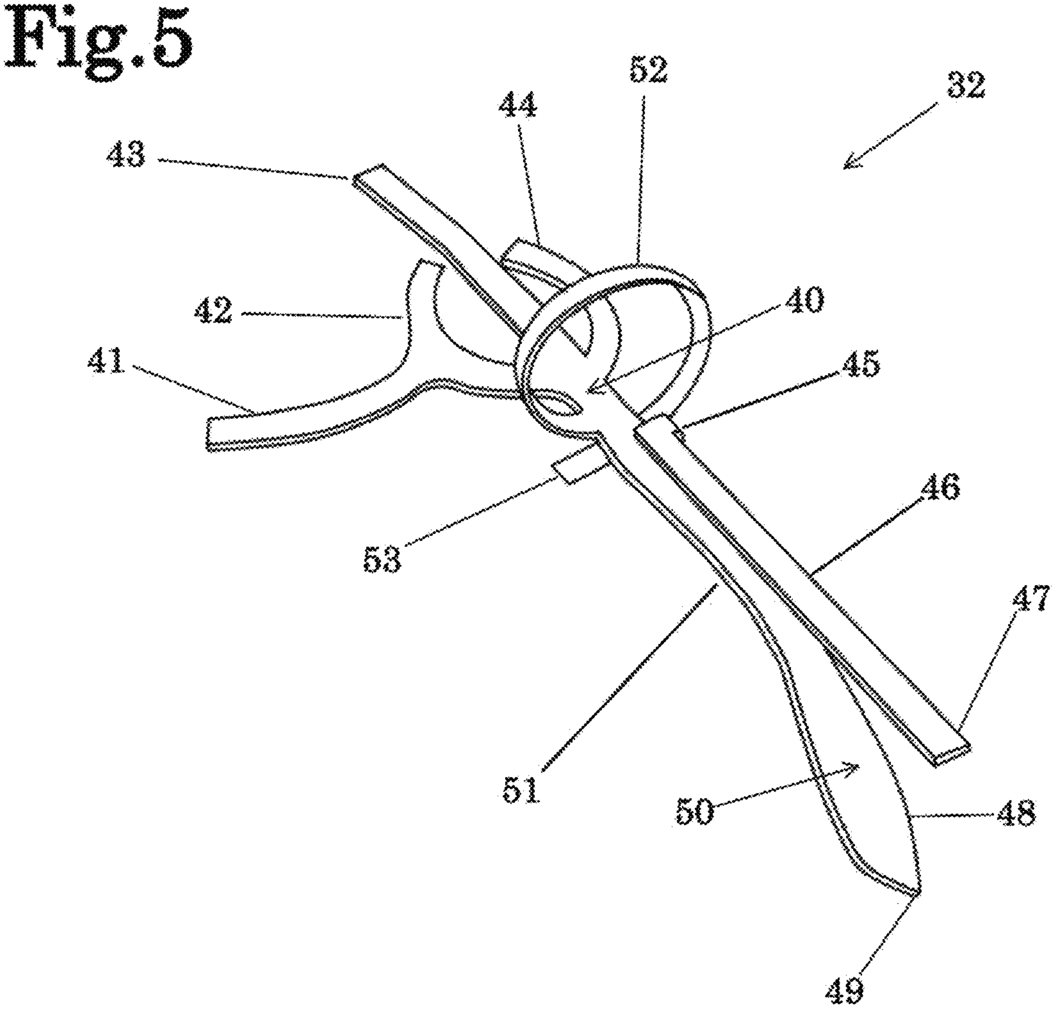
FIG. 5 shows a new configuration of the pick blank shown in FIG. 4, with two modifications having been made.

FIG. 5 shows the first stage (32) in the configuration of the pick blank (31) shown in FIG. 4, with two modifications having been made. First, the profile extention arm (46) which in FIG. 4 is parallel to and in the same plane as the blade shaft (51), has been bent at the profile extention arm offset (45) such that it now lies in a plane directly above that of the blade shaft (51), though still running parallel to it. Second, the retention band (52) has now been configured into a ring approximately the diameter of the intended player's finger just behind the first knuckle (14) as pictured in FIG. 2. The tip (53) of the retention band represents excess material, to be further bent and trimmed in subsequent adjustment.

Figure 6:
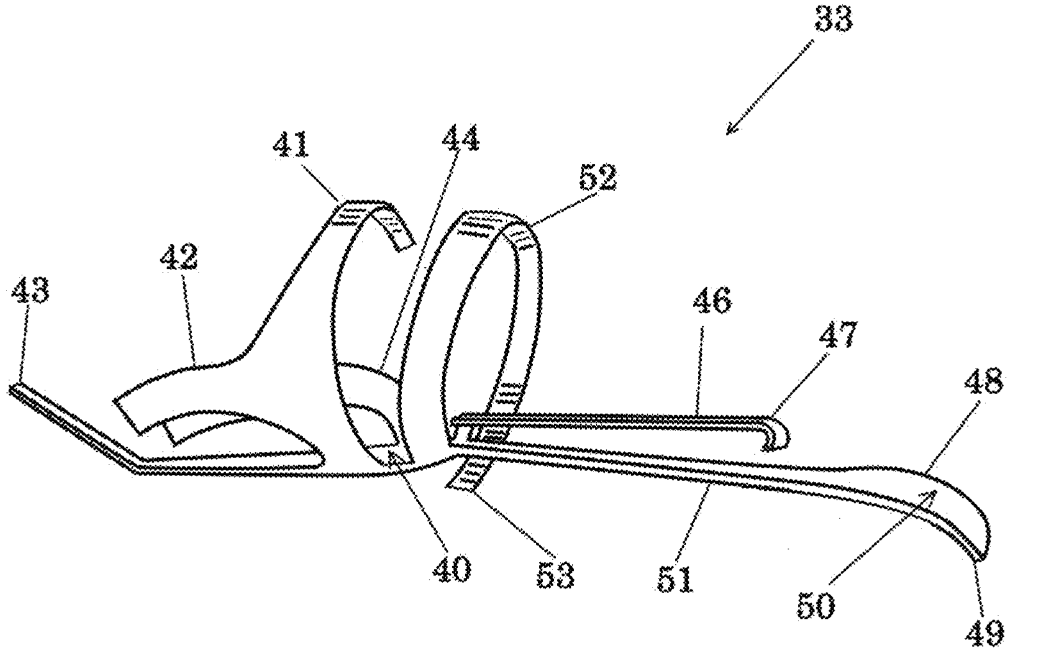
FIG. 6 shows a new configuration of the partially-formed pick of FIG. 5, after four further modifications.
Figure 9:
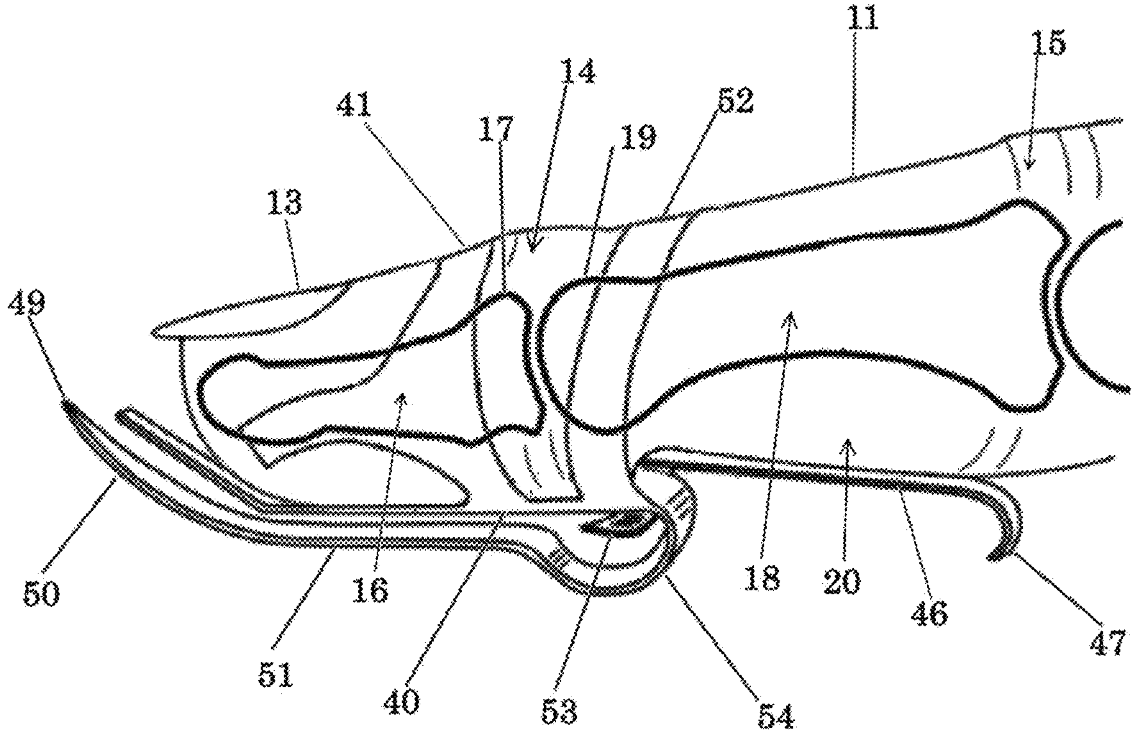
FIG. 9 shows the pick of FIG. 7 in its intended position on a musician's finger. The finger is again shown in a side view and in outline form as it might appear with the assumption that skin and flesh are transparent. Relationships are thus made apparent, between aspects of the pick of the present invention and aspects of the bones of the finger.

FIG. 6 shows, in a side view, the next stage (33) of configuration of the partially-modified pick (32) of FIG. 5, reflecting the following additional modifications: the left rail (42) has been curved upward into a roughly vertical position; the right rail (44) has been curved up in similar fashion; the thrust receiver band (41), continuing the curve of the left rail (42) has been further curved into a semi-circular arc approximately the diameter of the first segment of the player's finger just ahead of the first knuckle (cf. FIG. 9, ref. #14). The blade locator arm (43) has been bent upward to a temporary position in front of side rails (42) and (44).

Figure 7:
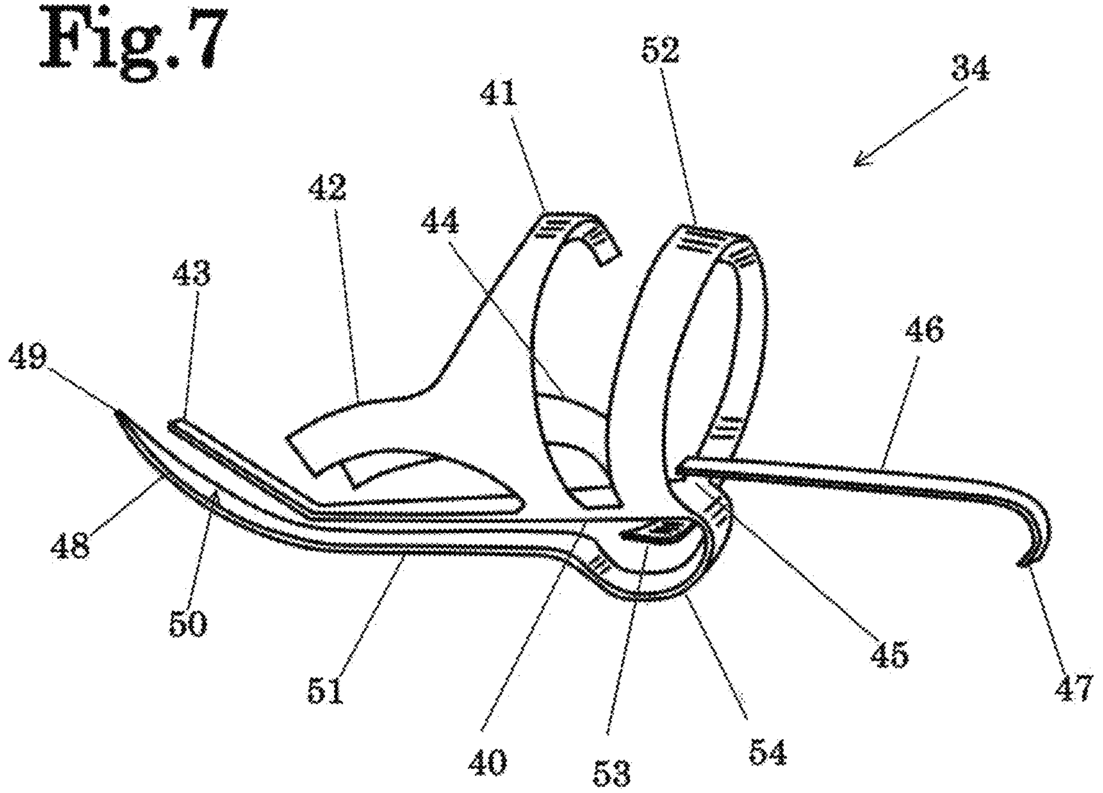
FIG. 7 shows the pick in its next stage of configuration, comprising the pick of FIG. 6 modified in three additional ways.

FIG. 7 shows the pick (34) in its next stage of configuration, comprising the pick (33) of FIG. 6 modified in two additional ways. First, the blade shaft (51) has been bent to form a loop (54) (henceforth referred to as the Reverse Loop) beginning immediately rearward of the profile extention arm offset (45), in such a way as to reorient the blade shaft (51) together with blade (50) toward the forward end of the pick (35). The shaft (51) now lies in line with and in a plane beneath and parallel to the plane of the body (40). Second, the blade (50) has been curved upward in front of the blade locator arm (43) giving it an initial curvature subject to further adjustment as the pick's caster angle (cf. FIG. 3, ref. #23) is fine-tuned by the player.

Figure 8:
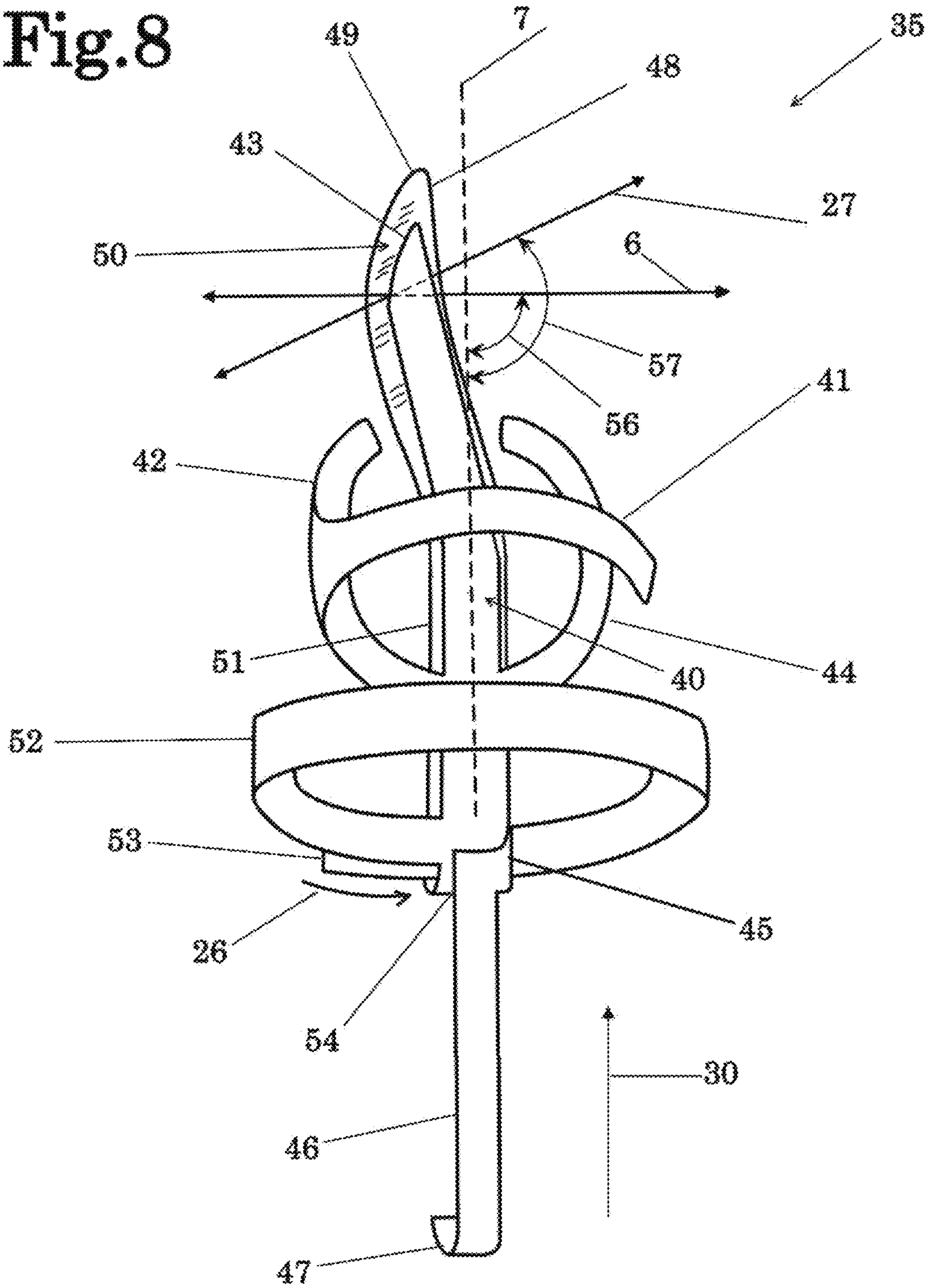
FIG. 8 shows a further view of the pick as described in connection with FIG. 7, now seen from the perspective of a wearer preparing to slide the pick onto a finger.

FIG. 8 shows a further view (35) of the pick (34) as described in connection with FIG. 7, now seen from the perspective of a player preparing to slide the pick onto a finger as the hand approaches it palm-down and in the direction indicated by the arrow (30). Here we see the blade locator arm (43) having been trimmed and bent forward, if necessary, to make firm contact with the underside of the upturned blade (50). The tip (53) of the retention band (52) may be deformed in the direction of the arrow (26) in order temporarily to enlarge the circle formed by the retention band (52), to permit passage of the retention band (52) over the first knuckle of the player's finger (cf. FIG. 9, ref #14).

The orientation of the curvature of the blade (50) is represented by line (27), while arc (57) represents its angle relative to the longitudinal axis (7) of the pick. For comparison, the orientation of the curvature of the blade of a pick of the prior art (cf. FIG. 1, ref. #6) is represented here by line (6), with arc (56) representing its typical (90°) angle relative to such a pick's longitudinal axis (cf. FIG. 1, ref. #7). The difference between arc (56) and arc (57) illustrates the fact that the design of the blade (50) of the present invention allows the pick to make contact with a string along an edge (48) of the blade (the leading edge) rather than further in toward the center of the blade, as with a typical pick of the prior art.

Firm pressure of the blade locator arm (43) against the rearward surface of the blade (50) serves two purposes: first, to prevent dislocation of the blade (50) relative to the pick (35) overall; and second, to prevent rearward dislocation of the pick (35) relative to the player's finger. This latter function it achieves by transmitting thrust against the blade to the left rail (42) and the thrust receiver band (41), which, as can be seen in FIG. 9, is stabilized by the metaphysis (17) of the distal phalange (16). Not being relied upon to provide it own positional stability relative to the entire pick (35), the blade (50) of the present invention can be flat (undished) and relatively narrow, with a long blade shaft (51). These factors permit the direction of orientation (27) to be changed easily by re-curving the blade (50), thus increasing or decreasing the degree of lead (57) given to the leading-edge (48).

FIG. 9 shows the pick of FIG. 7 in its intended position on the player's finger (11), in a side view and with the assumption that both pick and flesh are transparent, revealing the relevant skeletal components of the finger and their relationship to the pick. It shows, in particular, where the thrust receiver band (41) lies relative to the metaphysis (17) of the distal phalange (16), and where the retention band (52) lies relative to the distal metaphysis (19) of the medial phalange (18). In a further adjustment of the pick (34), the profile extention arm (46) has been trimmed and curled at the tip (47) so as to provide more comfortable contact with the flesh of the palmar surface (20) of the finger below the second knuckle (15). The position of the profile extention arm (46) and tip (47) allows the wearer to limit, by shaping the extention arm, the extent to which the finger may curl as the pick is brought into contact with a string.

Figure 10:
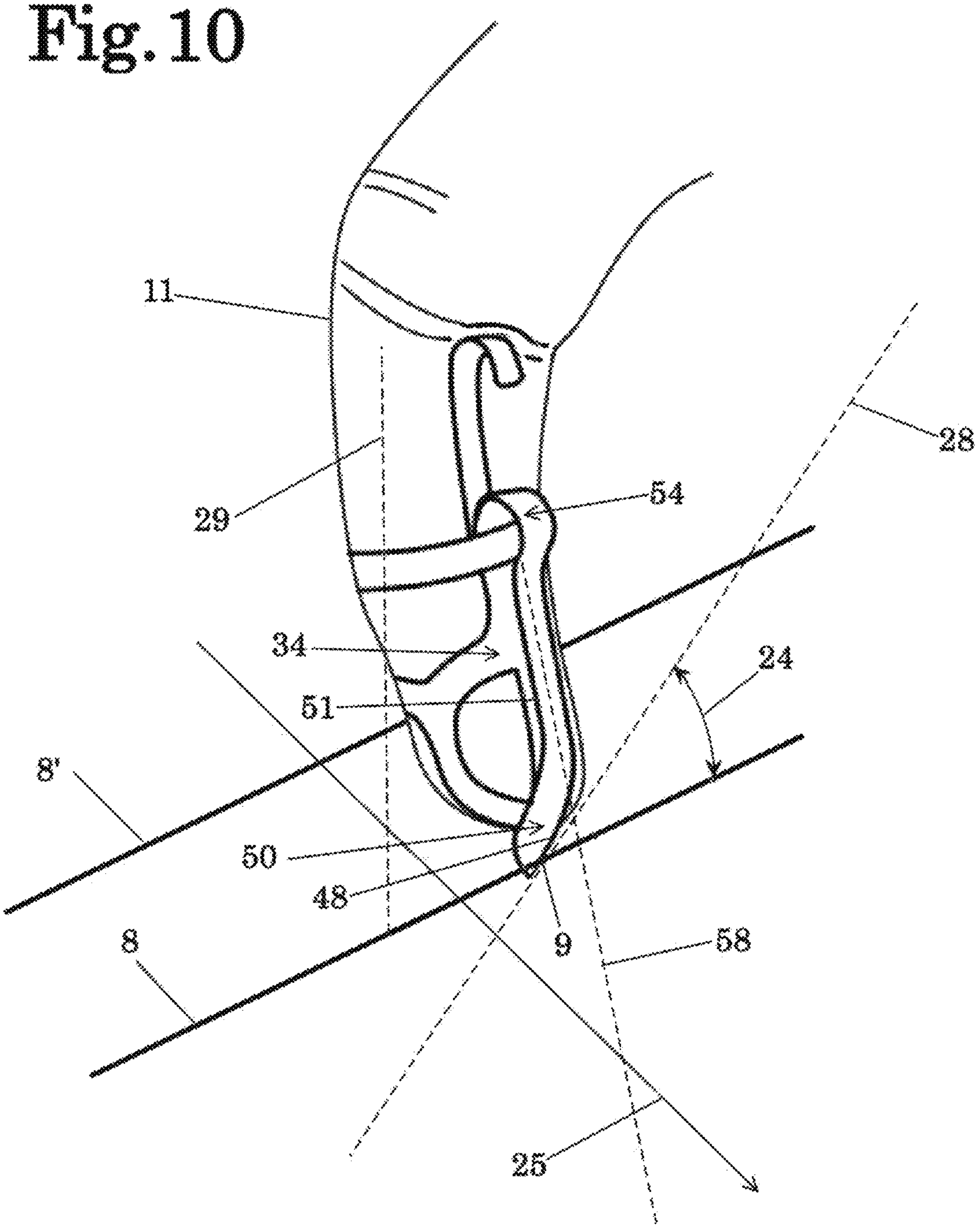
FIG. 10 shows the pick of FIG. 7 in its function of activating the string of a musical instrument. It illustrates three novel parameters of adjustment offered by the present invention: lead, camber, and profile.

FIG. 10 shows a further view of the pick (34) of FIG. 7, now seen from the perspective of a user of the pick, as the finger (11) on which the pick is worn actuates a string (8) of a musical instrument. It illustrates the orientation of the leading edge (48) of the pick (34) as the blade (50) contacts the string (8). Line (25) indicates the direction of the stroke of the finger (11) across the string (8), which together with string (8') defines the plane of the strings of the instrument. Line (29) is perpendicular to the plane of the strings. The camber of the blade is defined by the angle (24) between string (8) and line (28), which is tangent to the curve of the leading edge (48) of the blade (50) at its point of contact (9) with the string (8) and which lies in a plane determined by string (8) and line (29), which plane is thus perpendicular to that of strings (8) and (8'). Camber can be adjusted by twisting the blade shaft (51) around its axis, represented by line (58) running forward from the Reverse Loop (54).

Figure 11:
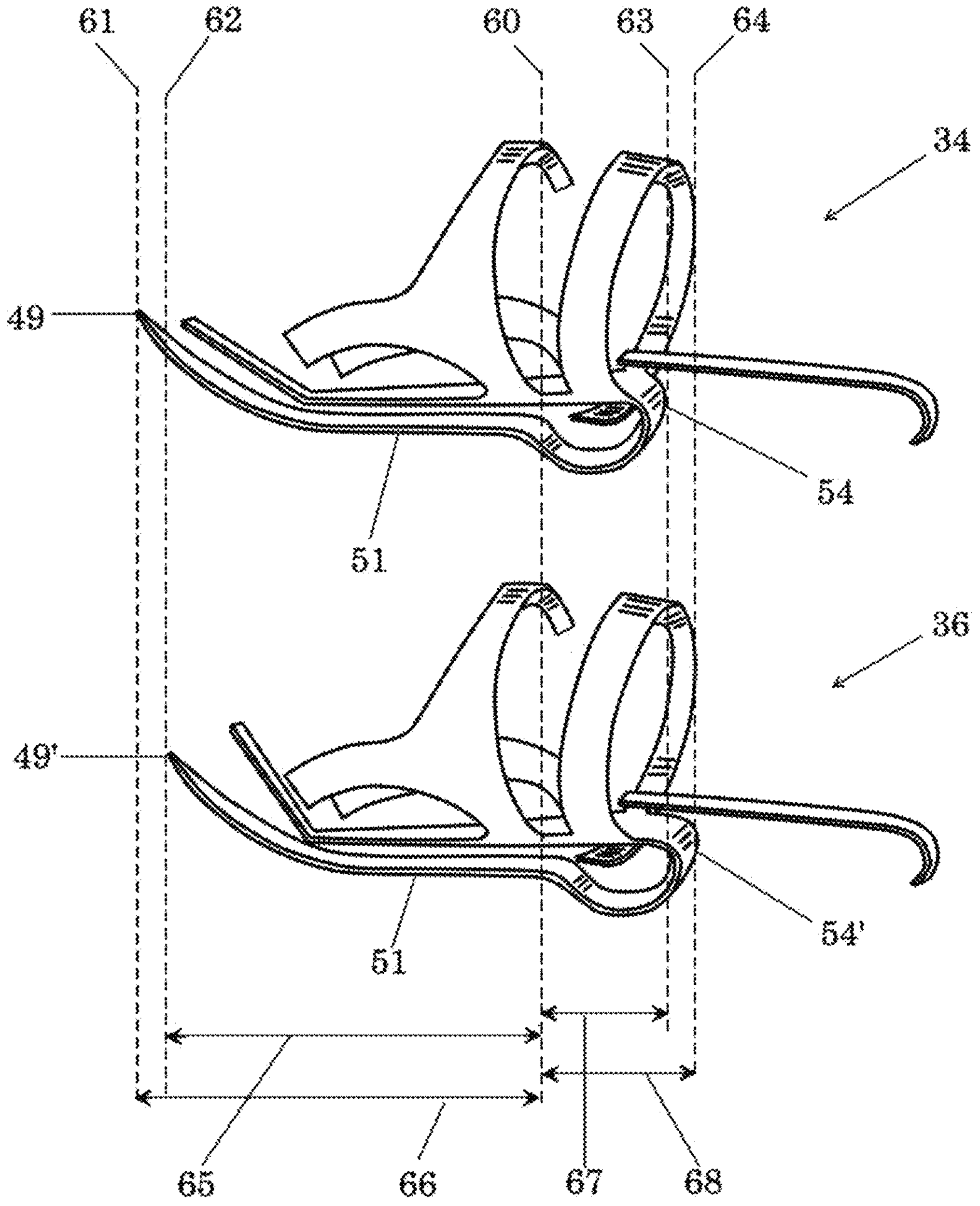
FIG. 11 offers a comparison between two states of adjustment of the pick of FIG. 7, to illustrate the role of the Reverse Loop in fine-tuning the pick.

FIG. 11 offers a comparison between two adjustment settings of the pick (34) of FIG. 7. View (34) shows the pick in its original form with its tip (49) extending to line (61), at distance (66) from measurement baseline (60), and the rearmost curve of its Reverse Loop (54) extending to line (63), at distance (67) from measurement baseline (60). View (36) shows pick (34) after having been adjusted to reduce its reach (cf. FIG. 3, ref. #21). Its tip (49') extends only to line (62), at distance (65) from baseline (60), while the rearmost curve of its reverse loop (54') extends to line (64) at distance (68) from baseline (60). The difference between the two forward distances (66 and 65) approximates the difference between the two rearward distances (68 and 67), illustrating how the Reverse Loop can take up or supply material of the blade shaft (51) as needed for extending or retracting the tip, without requiring adding or subtracting any material. In an extended position, as shown in view (34) the additional material available at the forward end of the pick could be reformed to raise its loft (cf. FIG. 3, ref. #22), for example, while preserving its caster (cf. FIG. 3, ref. #23) or to change its caster without changing its reach.

The invention claimed is:

1. A pick to be retained on a musician's finger for actuating a string of a musical instrument comprising:

a body portion extending longitudinally along an underside of the musician's finger;

a first side rail portion connected to a first side of the body portion running parallel to the body portion and configurable to lie along a first side of the musician's finger;

a second side rail portion connected to a second side of the body portion running parallel to the body portion and configurable to lie along a second side of the musician's finger;

a blade shaft portion extending rearward from the body portion, the blade shaft portion further comprising an origin of the blade shaft portion, the blade shaft portion being configurable into a curve near the origin of the blade shaft portion such that the blade shaft portion extends along the body portion;

a blade portion configurable into an arc wrapping upward ahead of the finger in an orientation that contacts the string of the musical instrument;

a locator arm extending along the finger from said body portion and configured to stabilize a position of the blade when the blade contacts the string of the musical instrument; a retention band extending laterally from the body portion and being configurable into a ring encircling a portion of the finger;

a thrust-receiving band extending laterally from the first side rail and being configurable into an arc encircling a portion of the finger; and a tail portion extending from a rear end of the body portion, the tail portion further comprising a curvature and a length, where the curvature and the length are configurable to limit the degree of flex relative to the musician's finger when the pick contacts the string of the musical instrument.

2. The pick of claim 1 where the retention band is configurable to allow expansion for placement of the pick on the finger.

3. The pick of claim 1 where the retention band is configurable to allow contraction after placement of the pick on the finger.

4. The pick of claim 1, where the blade shaft and the blade portion extend a configurable distance from a tip of the finger, the distance being configurable by changing the curve of the blade shaft.

5. The pick of claim 1 where a position of the locator arm portion is configurable to rest along a posterior surface of the blade, such that a force applied longitudinally to the pick at the blade is transmitted through the locator arm and the body to the thrust-receiving band.

6. The pick of claim 1 where the thrust-receiving band further comprises a configurable length and curvature to conform firmly and comfortably to the finger.

7. The pick of claim 1 where the tail portion further comprises a configurable length and curvature to limit flexation of a distal joint and a medial interphalangeal joint of the finger when the blade contacts the string of the musical instrument.

8. The pick of claim 1 where an edge of the blade is a forward-most part of the pick.

9. The pick of claim 1 wherein the pick is formed from a material selected from a group comprising 22 gauge brass sheet, 22 gauge nickel silver sheet, or material of similar thickness, resilience and workability.

* * * * *